(12) United States Patent
Blevins

(10) Patent No.: US 9,656,307 B1
(45) Date of Patent: May 23, 2017

(54) POWERED HOSE PULLER

(71) Applicant: Barry I. Blevins, Pacific Grove, CA (US)

(72) Inventor: Barry I. Blevins, Pacific Grove, CA (US)

( * ) Notice: Subject to any disclaimer, the term of this patent is extended or adjusted under 35 U.S.C. 154(b) by 0 days.

(21) Appl. No.: 14/939,282

(22) Filed: Nov. 12, 2015

(51) Int. Cl.
*B08B 9/043* (2006.01)
*E03F 9/00* (2006.01)

(52) U.S. Cl.
CPC ............. *B08B 9/0433* (2013.01); *E03F 9/00* (2013.01)

(58) Field of Classification Search
CPC ................................. B08B 9/0433; E03F 9/00
See application file for complete search history.

(56) References Cited

U.S. PATENT DOCUMENTS

| | | | | |
|---|---|---|---|---|
| 810,259 A * | 1/1906 | Britton | ................... | A62C 33/02 100/171 |
| 3,946,918 A * | 3/1976 | Babbin | ................ | B29C 35/065 226/1 |
| 4,540,017 A * | 9/1985 | Prange | ................. | B65H 75/441 137/355.12 |
| 5,139,751 A * | 8/1992 | Mansfield | ............... | B05B 13/06 118/306 |
| 5,681,131 A * | 10/1997 | Goldenberg | ............ | F16L 55/28 242/118.1 |
| 8,336,857 B2 * | 12/2012 | Davis | ........................ | B08B 9/04 254/134.3 FT |
| 9,272,874 B1 * | 3/2016 | Davis, Jr. | ................ | B65H 51/32 |
| 2005/0035142 A1 * | 2/2005 | Davis | ........................ | B08B 9/04 221/283 |

* cited by examiner

*Primary Examiner* — Joseph J Hail
*Assistant Examiner* — Marc Carlson
(74) *Attorney, Agent, or Firm* — LaRiviere, Grubman PC

(57) ABSTRACT

A powered, portable device for pulling a hose such as a sewer hose into an access hole such as a sewer manhole. The device is sufficiently long to extend over the access hole and has a lateral support structure extending from the bottom of the device into the access hole to engage a side surface of the access hole to prevent the device from being pulled across the ground during operation. Upper and lower frame portions are connected by a hinge at one end of the device to allow the device to be opened up to install the hose into the device. With the hose installed the upper frame can be clamped down to the lower frame to engage the hose. The upper and lower frames have gripping elements, at least one of which is powered by a motor to rotate and pull the hose into the access hole.

18 Claims, 9 Drawing Sheets

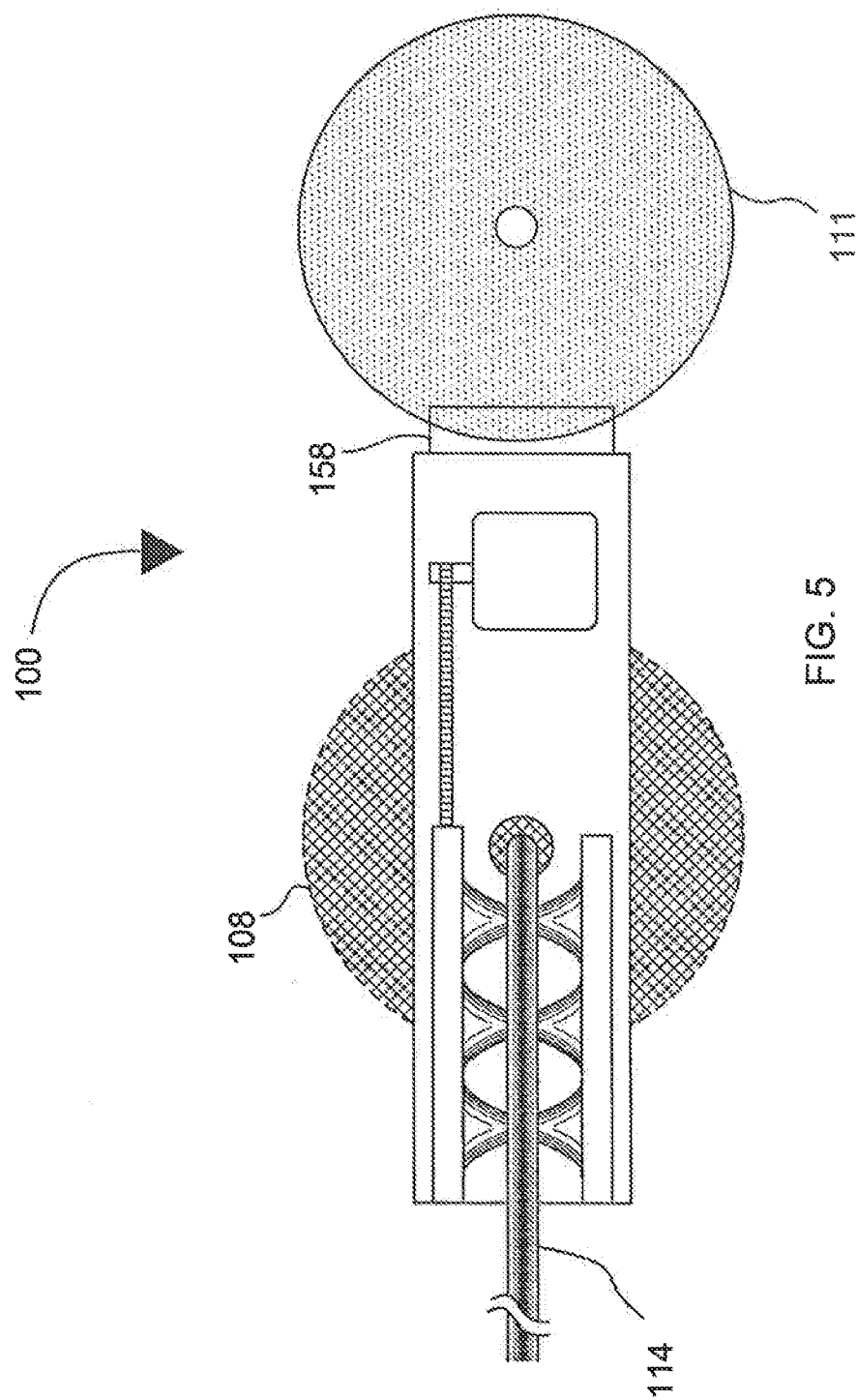

POWERED HOSE PULLER

TECHNICAL FIELD

The present invention relates to an apparatus for pulling a hose, and more particularly, to an apparatus for pulling a sewer hose from a hydro cleaning truck to a manhole located in a remote area for cleaning wastewater collection system lines.

BACKGROUND OF THE INVENTION

Mobile truck and sewer cleaning machines are commonly used by municipalities and others for cleaning wastewater collection system lines (sewer lines) using a sewer hose to deliver high pressure water. Such cleaning is periodically necessary to remove accumulated sludge and sediment. The sewer hose is inserted into the sewer line typically at a downstream manhole. Once inserted, the sewer hose is generally propelled up-stream through the sewer line by the high pressure water. The debris and sediment dislodged by the high pressure water is washed downstream and collects in the downstream manhole.

The high pressure water used to dislodge the debris and sediment is supplied by a hydro cleaning truck. The cleaning truck includes a pumping mechanism connected to a fluid supply for delivering water under jet pressure through one or more sewer hoses wound on a reel. The hose may be wound onto or unwound from the reel to thread the hose into or withdraw it from the sewer line. Unfortunately, a standard hydro cleaning truck is often not able to reach manholes located in remote areas. When manholes cannot be reached by the hydro cleaning truck, additional equipment and crew members are required.

Bulky equipment such as large tractors are typically used to reach manholes located in remote and/or hard to reach areas. Quite often, the traditional used machine requires additional resources and personnel. For instance, it has to be transported to the job site with a truck or trailer which requires one or more additional workers. Additionally, the machine generally takes up a lot of valuable time to transport to its desired location after being unloaded from the truck since it travels very slowly. Moreover, getting this machine to its desired location can be very dangerous since it could roll over as the operator traverses across uneven terrain.

Often a sewer access cannot be reached by such a large machine, because of space or other constraints. If the machine cannot reach a manhole, then workers are required to pull the sewer hose by hand into the sewer line to be cleaned. This can be an arduous task if the manhole is hundreds of feet away from the hydro cleaning truck. Importantly, this type of labor could lead to serious injuries such as shoulder, joint or back injuries since the workers have to be bent over in order to pull the sewer hose into the sewer line. Further, the labor involved is very strenuous as a result of the weight of the water inside the hose, the resistance of the hose on the ground and the length of the hose being pulled.

In light of the shortcomings in the prior art, there clearly exists a need for an apparatus to simplify' the cleaning of sewer lines with remote manhole access points and limited access to hydro cleaning equipment.

SUMMARY OF THE INVENTION

The present invention is a new powered sewer hose puller designed to simplify the cleaning of wastewater collection system lines with manhole access points located in remote areas with limited access for hydro cleaning equipment, such as hydro cleaning trucks or tracked or wheeled traditional easement machines.

The device includes an upper frame and a lower frame connected with one another by a hinge to allow the upper frame to pivot relative to the lower frame. A first gripping element and a second gripping element are mounted to the lower and upper frames, and a latch is connected with the upper and lower frames for latching the upper and lower frames in a closed position. A motor or drive mechanism is connected with at least one of the gripping elements to rotate the gripping elements for pulling the hose.

The device can advantageously be constructed so as to be light weight, compact, easily assembled and stored in any position on a jet truck, and then easily removed and taken to a desired remote location to clean a sewer line.

Another aspect of the present invention is to provide a low cost, high efficiency sewer hose puller that allows sewer lines to be cleaned quickly while helping to conserve water since the water tank of the hydro cleaning truck is not depleted as fast as would be the case if the hose were to be pulled manually into the sewer line.

A further aspect of the current invention is that it prevents injuries to workers by reducing the need for manual labor such as workers having to bend over to pull the sewer hose into a sewer line.

The present invention also provides a device which can be easily stored since it is configured to be quickly assembled and disassembled.

Consequently, for a better understanding of the present invention, its functional advantages and the specific objects attained by its uses, reference should be made to the accompanying drawings, claims and descriptive matter in which there are illustrated preferred embodiments of the invention.

BRIEF DESCRIPTION OF THE DRAWINGS

FIG. 5 is a top view of one embodiment of the hose pulling device located over a sewer access hole.

DETAILED DESCRIPTION

The following detailed description is of the best currently contemplated modes of carrying out various embodiments of the invention. The description is not to be taken in a limiting sense, but is made for at least the purpose of illustrating the general principles of the invention, since the scope of the invention is best defined by the appended claims.

Figure 1:
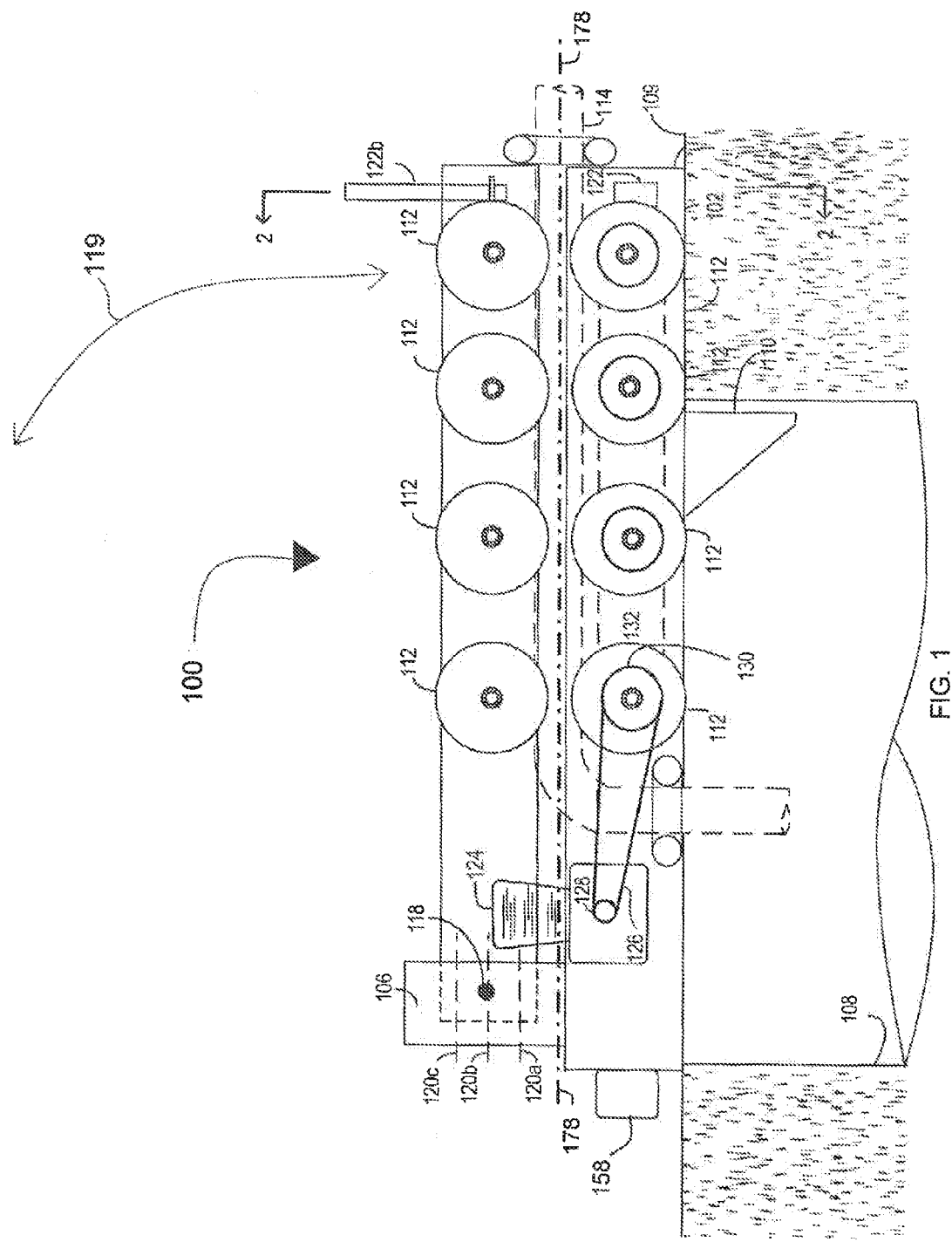
FIG. 1 is a side view of a hose pulling device located over a sewer access hole.
Figure 1A:
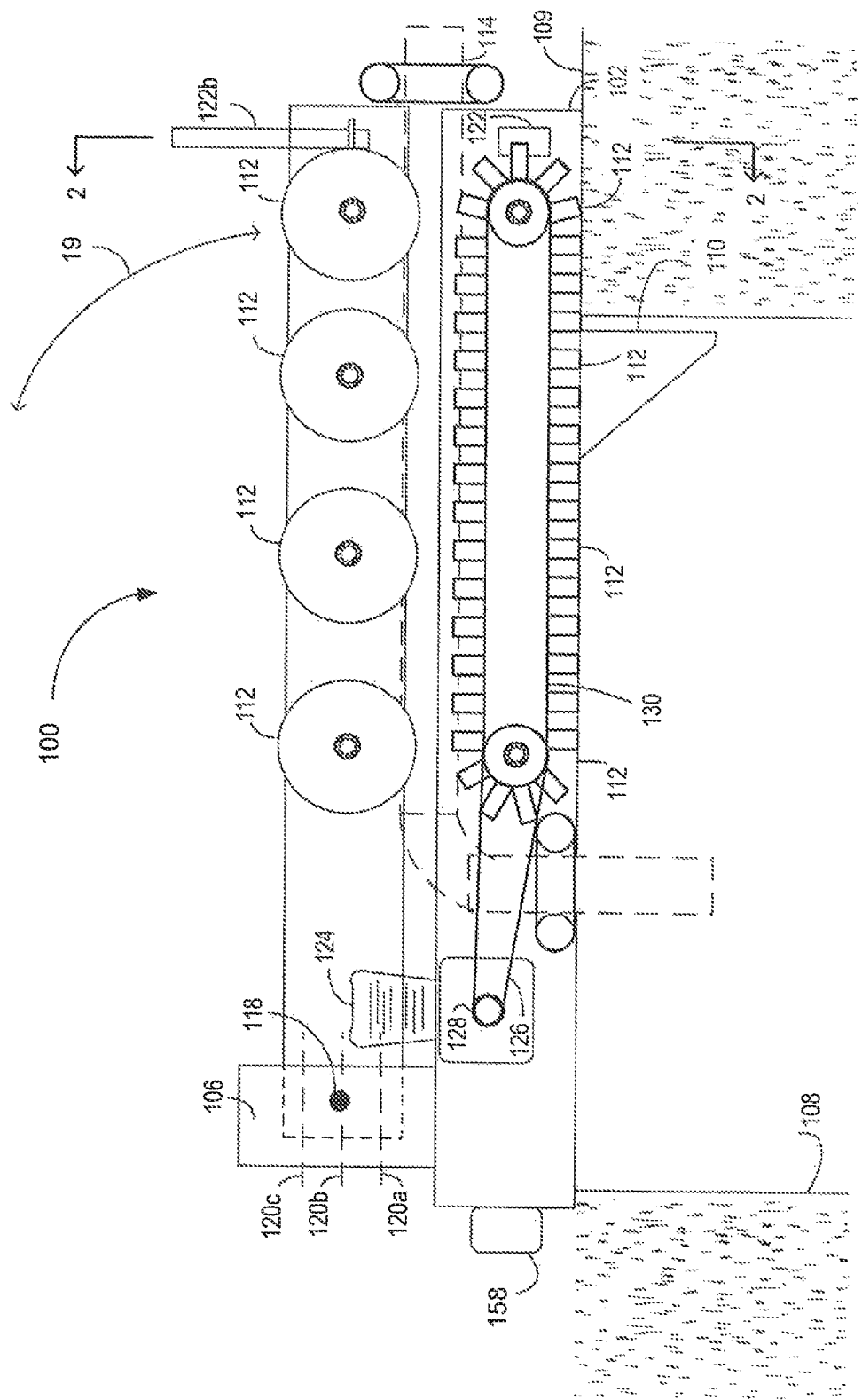
FIG. 1A is a side view of another embodiment of a hose pulling device located over a sewer access hole.
Figure 1B:
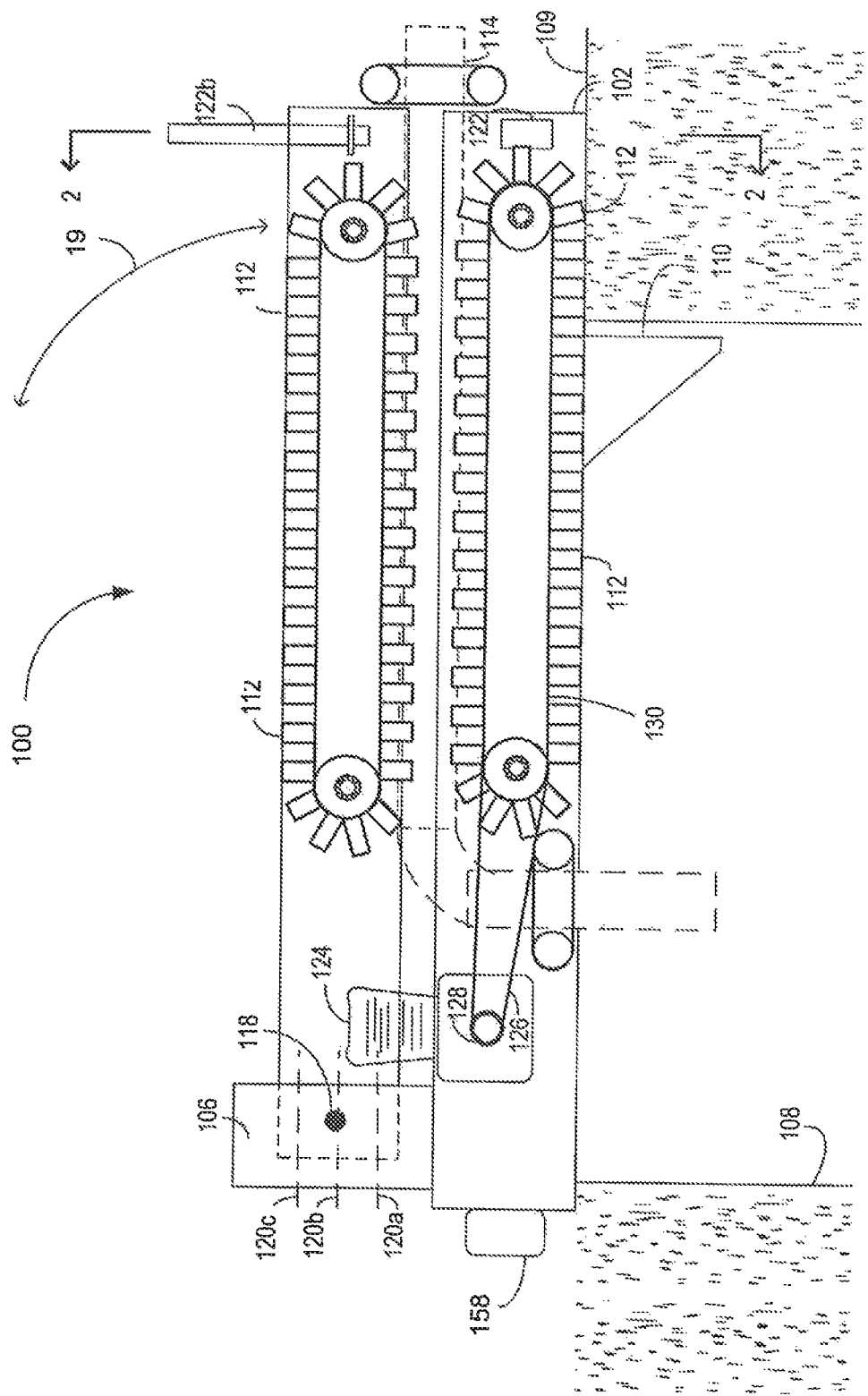
FIG. 1B is a side view of a further embodiment of a hose pulling device located over a sewer access hole.

With reference to FIGS. 1, 1A and 1B, a hose pulling device 100 is shown that includes a lower frame portion 102 and an upper frame portion 104 that are connected with one another at one end by a hinge mechanism 106. The hose pulling device 100 is configured to fit securely over an access hole such as a sewer access hole, commonly referred to as a man hole 108. (See also FIG. 5) To this end, the bottom frame 102 is sufficiently long so as to extend across the manhole and has a lateral support structure HO that can be configured to engage a side surface of the manhole so as to prevent lateral movement of the hose pulling device 100 during use. Although particular structures 110 are shown in FIGS. 1, 1A and 1B for preventing lateral movement of the device 100 during use, other such devices that can be referred to more generally as an anchor device can be contemplated for preventing lateral movement of the device 100 during use. This could include, for example, a structure for engaging or digging into the ground 109 or a device for attaching to a stationary structure.

Figure 2:
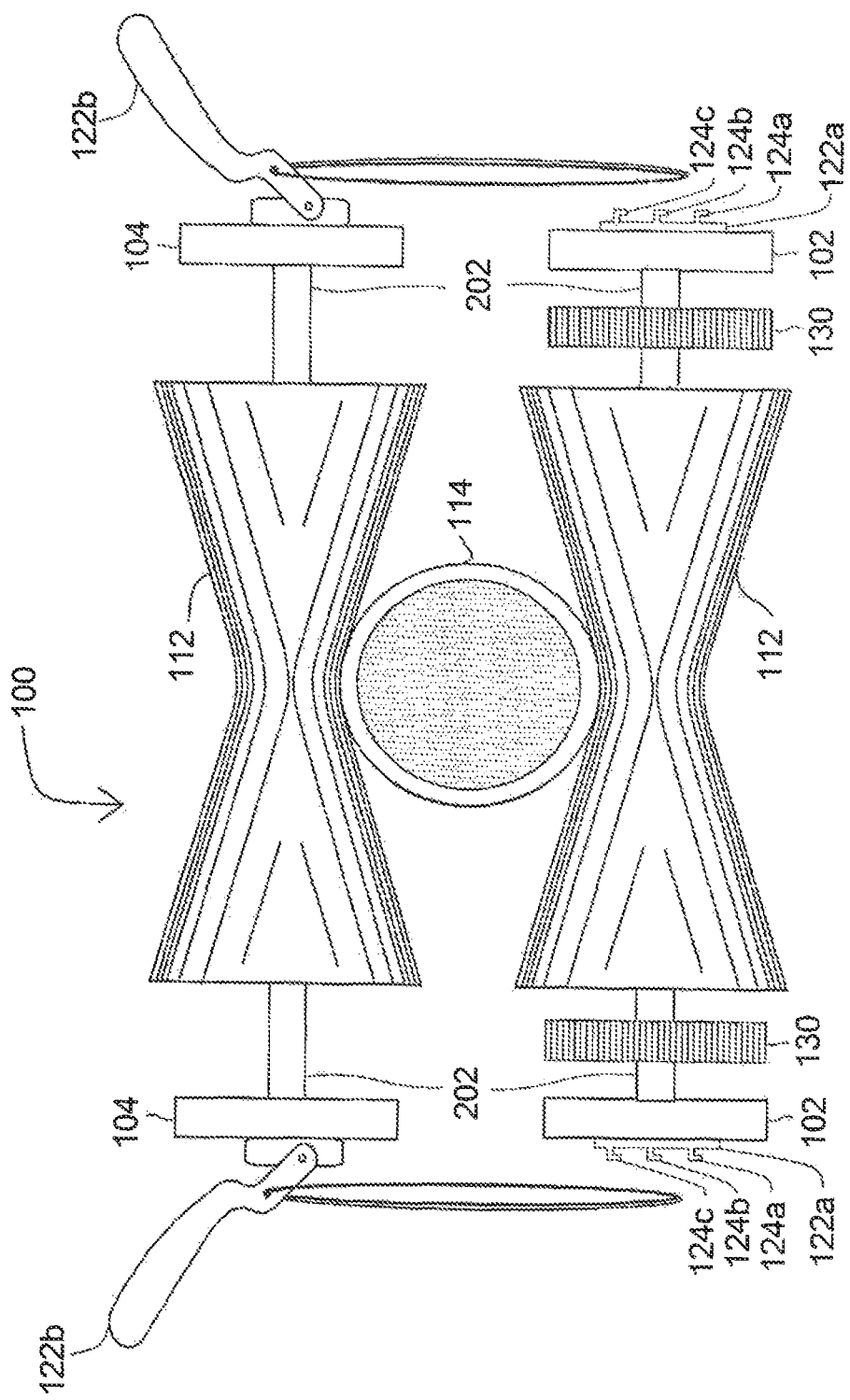
FIG. 2 is a view of the hose pulling device as seen from line 2-2 of FIG. 1.
Figure 2A:
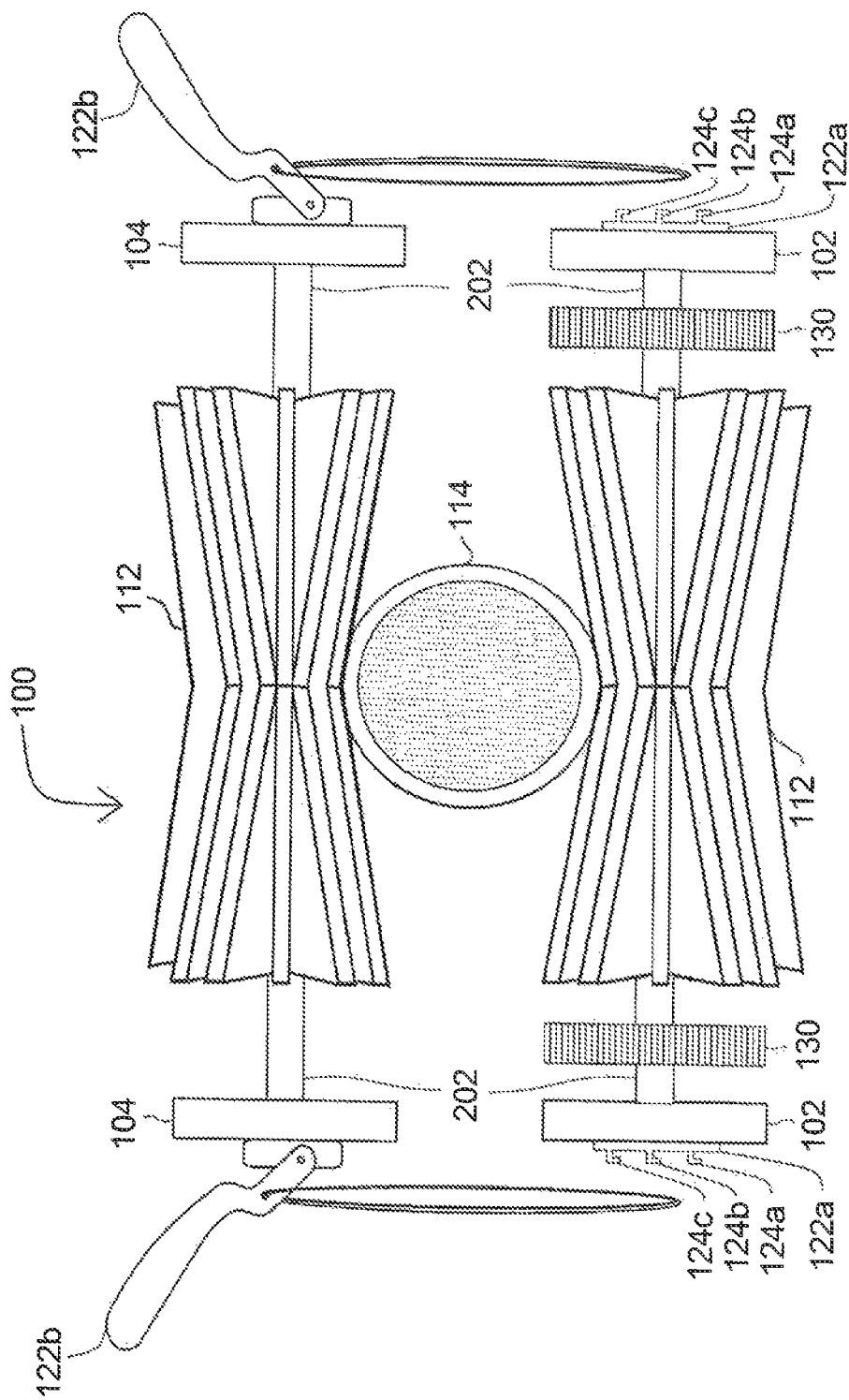
FIG. 2A is a view of another embodiment of the hose pulling device as seen from line 2-2 of FIG. 1.
Figure 2B:
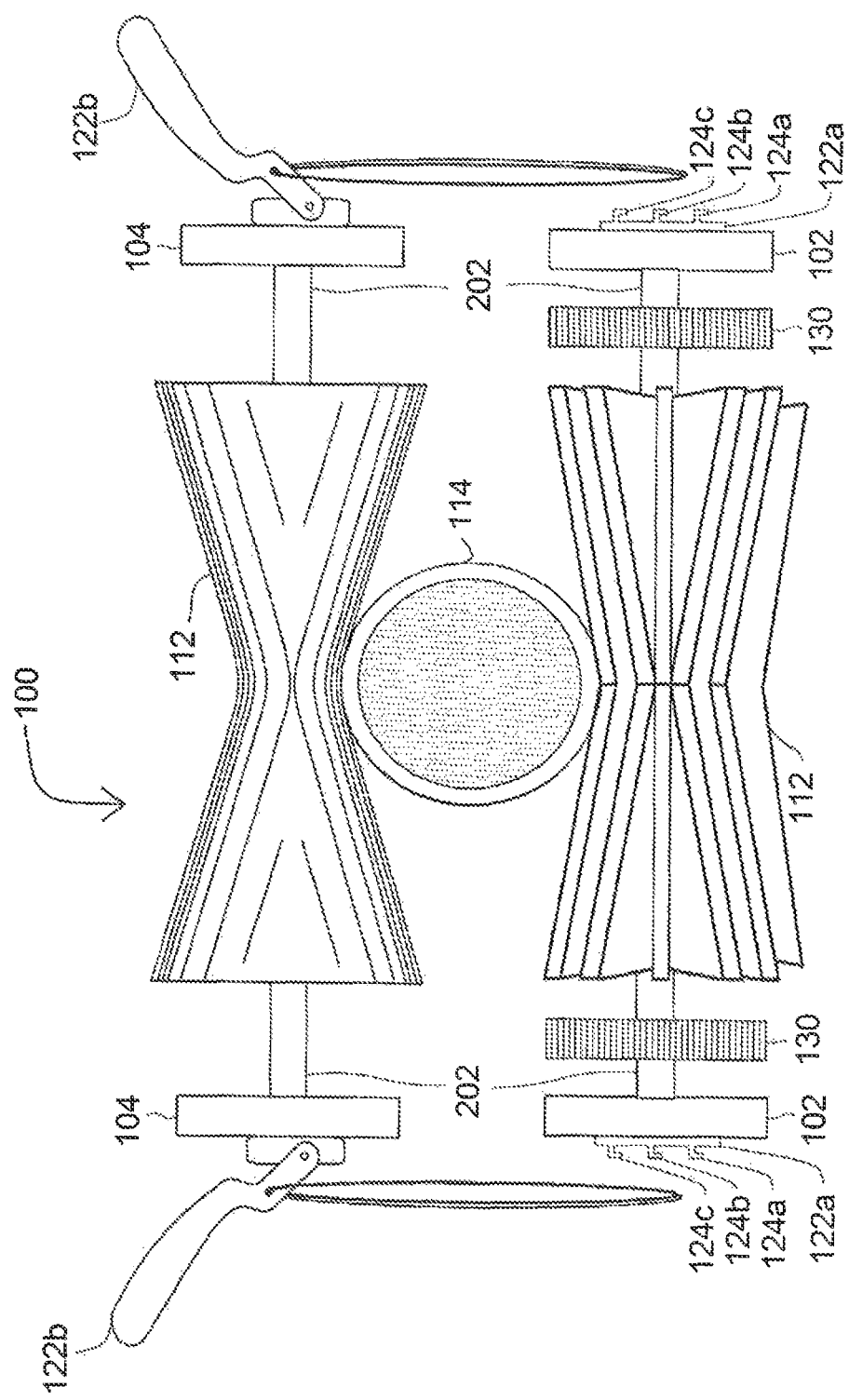
FIG. 2B is a further view of another embodiment of the hose pulling device as seen from line 2-2 of FIG. 1.

Each of the lower and upper frames 102, 104 have a first and a second gripping element 112 for securely engaging a hose 114, such as a sewer hose. The gripping elements 112 can be comprised of a plurality of rollers 112 or at least one belt 112 such as a conveyor type belt having a tread on the surface as shown in FIGS. 1, 1A, and 1B. To this end, in one embodiment, the plurality of rollers 112 are disposed substantially linearly in parallel with the axis 178 of the hose when this embodiment is used. Similarly, in another embodiment, the belts are disposed substantially linearly in parallel with the axis 178 of the hose when this embodiment is used. In addition, the axial reference point 178 of the hose 114 is illustrated in FIG. 1 but applies also to FIGS. 1A, 1B, and FIG. 3 respectively. Accordingly, the engagement of the hose 114 can be achieved with rollers 112 or at least one belt 112 having a suitable shape that can be seen more clearly with reference to FIGS. 2, 2A and 2B which are views seen from line 2-2 of FIGS. 1, 1A and 1B. As can be seen in FIGS. 2, 2A, and 2B, each of the gripping elements 112 can be formed with a "V" shape, having a smaller diameter at its center and a larger diameter at its outer ends. This shape is beneficial for securely holding the hose 114 during use as well as for holding hoses of different sizes and also for ensuring that those hose remains located at the center of the gripping elements 112 during operation.

With reference again to FIGS. 1, 1A and 1B, the upper and lower frames 102, 104 are connected with one another by an adjustable hinge 106. This hinge 106 allows the upper frame 104 to opposedly pivot relative to the lower frame 102 about a pivot point 118. This pivoting movement of the upper frame 104 relative to the lower frame 102 is indicated by a curved arrow 119 as shown in FIGS. 1, 1A, and 1B. The hinge 106 is adjustable in that the location of the pivot point 118 can be moved relative to the lower frame 102 so that the location of the pivot point can be at one of various locations closer to or further from the lower frame 102 as indicated by lines 120a-c. While three different pivot point locations are shown in FIGS. 1, 1A and 1B, this is by way of example only as the adjustable hinge 106 can be configured to allow for any desired number of pivot point locations 120. This adjustable feature of the hinge 106 advantageously allows for the accommodation of hoses 114 of various different sizes to ensure that the hose pulling device 100 can fit the hose 114 while also ensuring secure engagement of the hose 114.

With reference again to FIGS. 2, 2A, and 2B, the hose pulling device 100 also includes an adjustable latch 122 that includes a first portion 122a connected with the lower frame 102 and a second portion 122b connected with the upper frame 104, the upper portion being configured for engaging with and latching to the first portion 122a. While FIGS. 2, 2A, and 2B show the portion 122a being connected with the lower frame 102 and the portion 122b being connected with the upper frame 104, this is by way of example. The latch portions 122a could be connected with the upper frame 104 and portion 122b could be connected with the lower frame 102. The latch 122 is preferably an over-center type or similar type of latching device that provide leverage for tightly latching the frame portions 102, 104 together.

As can be seen in FIGS. 2, 2A, and 2B the latches 122 are located at either side of the frames 102, 104 so as to apply evenly distributed clamping tension between the frames 102, 104. Also as can be seen, the latches 122 are adjustable to accommodate different sized hoses 114 while ensuring sufficient pressure on the hose 114 between the gripping elements 112. To this end, in one embodiment, the latch is constructed such that the lower portion 122a has multiple engagement points 124a, 124b, 124c at various locations relative to a distance from the upper frame 104 and upper latch portion 122b. Again, while 3 different engagement points 124a-e are shown, this is by way of example only and some other number of engagement points could be included.

With reference again to FIGS. 1, 1A and 1B, the hose pulling device 100 includes a drive motor 124 for powering rotation of the gripping elements 112. The drive motor 124 is preferably located at an end of the device 100 that is opposite the lateral support structure 110 so as to provide a counterweight during operation as will be seen. The motor 124 could be an electric or internal combustion (gas powered 2 stroke or 4 stroke) motor. However, the motor is preferably an internal combustion, gas powered motor for portability and high power to weight ratio. The motor 124 is connected with the gripping elements by a drive train mechanism. This drive train mechanism can be a belt or chain drive or could even be a shaft, gear or direct drive system. For purposes of illustration this drive train mechanism is shown as a chain drive system that includes a drive chain 126 connected with a gear 128 of the motor and also with one or more gears 130 of the gripping elements 112. The gears 128, 130 can be configured so as to provide a desired reduction ratio to ensure optimal speed and power delivered to the gripping elements 112.

In one possible embodiment, as shown in FIGS. 1, 1A, and 1B the chain 126 can be used to deliver power from the motor 124 to one gripping element 112, and one or more secondary drive chains 132 can be used to transfer that power from that gripping element to the other gripping element 112. While FIGS. 1, 1A, and 1B show a mechanism for driving only the gripping element connected with the bottom frame 102, the drive train mechanism could be configured to drive the gripping element 112 connected with the top frame 104 as well. However, for simplicity, reliability and weight considerations the motor 124 is preferably configured to drive only the bottom rollers as this is deemed to provide ample power to move the hose 114.

With reference to FIGS. 2, 2A, and 2B it can be seen that each of the gripping elements 112 are connected with its associated frame 102, 104 by a combination axle and bearing 202 at each side of the gripping elements 112. In addition, in FIGS. 2, 2A, and 2B the gears 130 associated with each gripping element 112 can be seen as being connected with the gripping element at either end of the gripping element 112. However, the gears 130 could be connected with only one end of the gripping elements, and could be connected with only the bottom gripping element 112, or with both the top and bottom gripping element 112.

In operation, the hose puller device 100 is simply placed over an access hole 108, preferably with the lateral support structure 110 engaged against an interior side of the access hole as shown in FIGS. 1, 1A and 1B. (See also FIG. 5) Then, with the latches 122 unlatched, the upper frame 104 is pivoted upward as indicated by arrow 119 (See also FIGS. 1, 1A and 1B). With the device 100 opened up in this manner, the hose 114 is simply laid across the bottom gripping element 112 with its end extending into the access hole 108. The adjustable hinge 106 can be adjusted to accommodate the size of the hose 114 and to ensure a sufficiently tight fit on the hose 114. Then, the upper frame 104 is pivoted downward onto the hose 114 and the latches 122 are latched so as to provide a sufficiently tight pressure to securely hold the hose 114. The motor 124 is then turned on to rotate the gripping elements 112, thereby pulling the hose into the access hole 108. As mentioned previously, the motor 124 is located at an end of the device 100 that is opposite the lateral support structure 110 and also opposite the direction from which the hose is being pulled. This allows the motor 124 to act as a counterweight in order to prevent the device 100 from inadvertently being pulled off of the ground as a result of torque induced by the pulling of the hose 114. Likewise, a manhole lid 111 can be laid on a handle 158 that is mounted on the motor end of the device 100 to act as a counterweight during use.

As mentioned above, although a particular embodiment of the lateral support structure 110 is shown in FIGS. 1, 1A and 1B, this is by way of example of various embodiments. In fact, these embodiments can be particularly suitable for use over a sewer access hole such as a manhole as the access hole itself can provide an anchoring mechanism to prevent the device 100 from sliding across the ground when the hose 114 is being pulled. (See FIG. 5) More generally, other types of structures could be used to prevent such lateral movement of the device during use. Such a structure could more generally be referred to as an anchoring device, and could also include a structure that is configured to dig into or engage the ground 109 when the device 100 is being used in an application that includes use of the device 100 with an access hole 108 having suitable sides for engagement of the support structure 110 as depicted in FIG. 5.

Figure 3:
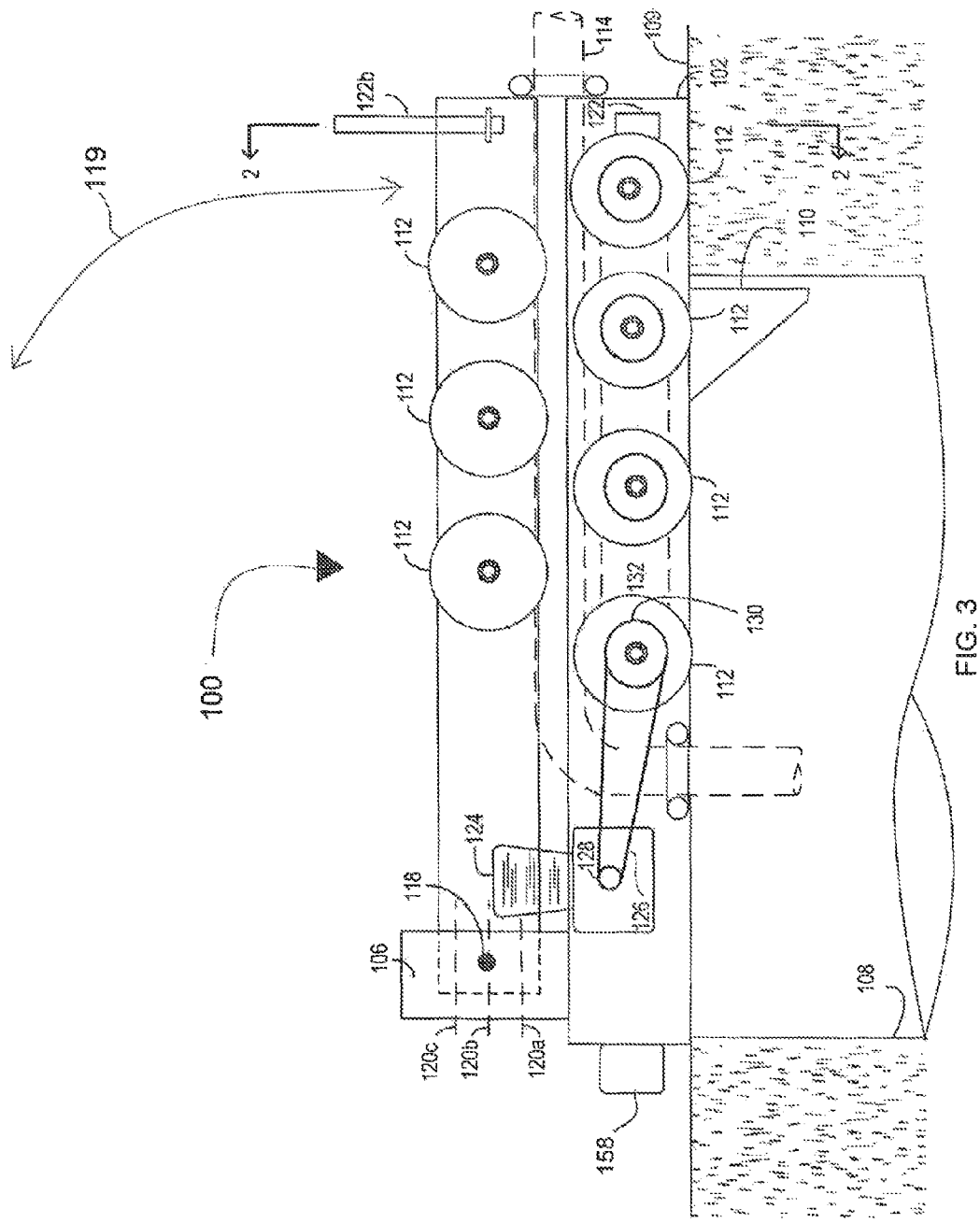
FIG. 3 is a side view of a hose pulling device according to an alternate embodiment.

As shown in FIG. 1, the rollers 112 of the top and bottom frames 104, 102 are arranged so that they are aligned with one another. This provides secure engagement of the hose without bending the hose in any way. In another embodiment, as shown in FIG. 3, the rollers 112 can be arranged so that they are offset from one another with the rollers 112 of the top frame 104 being located at a point between the rollers 112 of the bottom frame 102. Referring still to FIG. 3, the top and bottom rollers 112 advantageously define a serpentine pathway to rotatably grip and draw in the hose as it travels along the serpentine pathway. This arrangement can be beneficial where additional pressure against the hose is desired or where clearance of the upper and lower rollers relative to one another is an issue and where bending of the hose is not a concern.

Figure 4:
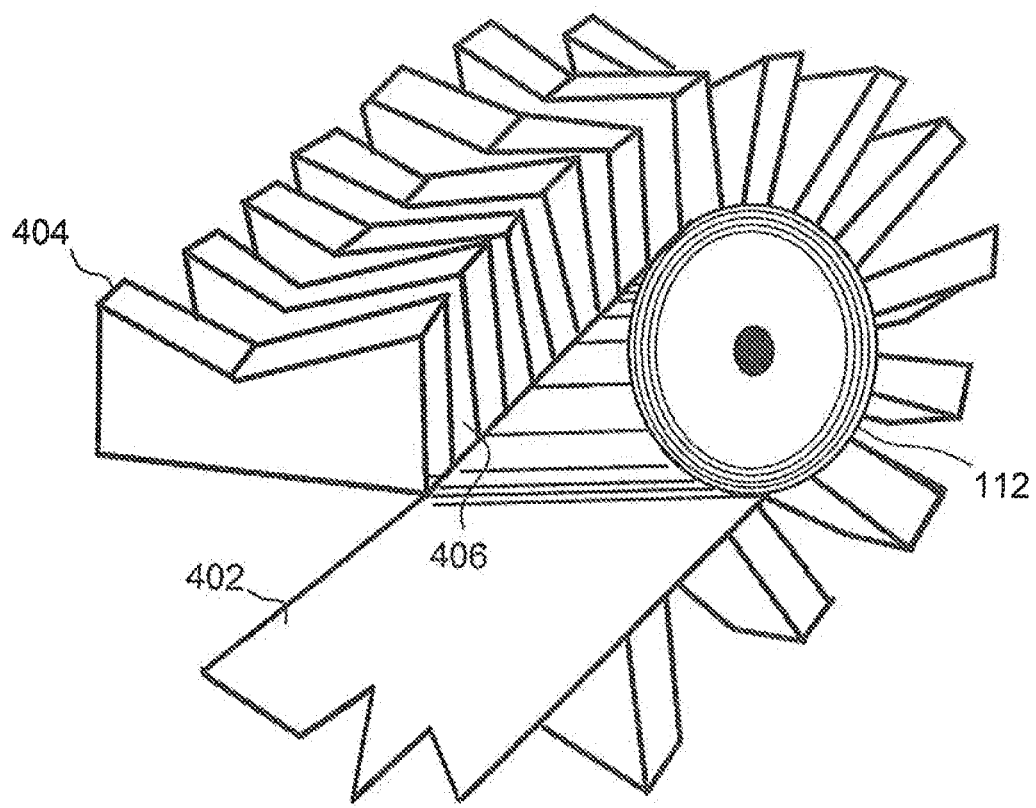
FIG. 4 is a view of a portion of the device according to yet another alternate embodiment.

With reference now to FIG. 4, in yet another embodiment, a belt system such as a conveyor belt system, can be used to engage the hose 114 (See also FIGS. 1A, 1B, 2A and 2B). This embodiment includes a belt 402 that could be powered by the rollers 112, which may or may not have the "V" shape described above with reference to FIGS. 2, 2A, and 2B. As those skilled in the art will appreciate, hoses, especially those used in sewer applications, can be very slippery. They often are covered with water, grease and other materials. Hence, they could easily hydroplane when being driven by a standard belt system. In order to accommodate this and ensure a secure grip on the hose 114 during operation, the belt is preferably configured with a tread pattern. FIG. 4 shows an example of such a tread pattern. In FIG. 4 it can be seen that the belt 402 has raised portions 404 and recessed grooves 406. The recessed grooves allow for displacement of surface film on the hose 114 which allows the raised portions 502 to securely grip the hose 114 during use.

It should be pointed out that, while the hose pulling device 100 is being described for use in pulling sewer hoses into a sewer access hole such as a manhole, the invention need not be limited to this application. The device could be used and/or configured for use for pulling hoses in other applications as well. For example, such as hose pulling device could be used in firefighting applications or even flood control situations where water hoses have to be moved into remote locations.

It should be understood that the foregoing relates to various embodiments of the invention and that modifications may be made without departing from the spirit and scope of the invention. It should also be understood that the present invention is not limited to the designs mentioned in this application and the equivalent designs in this description, but it is also intended to cover other equivalents now known to those skilled in the art, or those equivalents which may become known to those skilled in the art in the future.

What is claimed is:

1. An apparatus for pulling a hose to a desired location, the apparatus comprising:
   an upper frame;
   a lower frame having a top portion and a bottom most surface;
   wherein the upper frame and the top portion of the lower frame are connected to one another by a hinge to allow the upper frame to opposedly pivot relative to the lower frame, the bottom surface of the lower frame sufficiently sized to span across the entire diameter of a manhole;
   a first gripping element mounted on the top portion of the lower frame;
   a second gripping element mounted on the upper frame;
   a latch connected with the upper and lower frames for latching the upper and lower frames in a closed position, said closed position configured to engage the hose between the first and second gripping elements;
   a driving mechanism connected to at least one of the gripping elements to rotate the gripping elements for pulling the hose; and
   an anchoring structure projecting from the bottom surface in a direction opposite the top portion;
   the apparatus configured to be securely fit on top of the manhole with the bottom surface of the lower frame positioned across the entire diameter of the manhole and the anchoring structured engaged with an inside surface of the manhole to prevent movement of the apparatus in a direction the hose is pulled during use.

2. The apparatus as in claim 1, wherein the first and second gripping elements are a plurality of rollers disposed substantially linearly in parallel with the axis of the hose.

3. The apparatus as in claim 2, wherein each of the rollers have an inner portion and first and second outer end portions and wherein each inner portion has a smaller diameter than the first and second outer end portions.

4. The apparatus as in claim 2 wherein the rollers of the upper frame are aligned with the rollers of the lower frame in the closed position.

5. The apparatus as in claim 2 wherein the rollers of the upper frame are offset from the rollers of the lower frame in the closed position.

6. The apparatus according to claim 5, wherein the rollers connected to the lower frame are disposed directly at a position between the rollers connected to the top frame.

7. The apparatus according to claim 6, wherein the top and bottom rollers define a serpentine pathway to rotatably grip and pull the hose.

8. The apparatus according to claim 2, wherein each of the top and bottom rollers are configured to have a smaller diameter at its center and a larger diameter at their outer ends.

9. The apparatus as in claim 1, wherein the first gripping element is a belt having a tread on the surface opposed to the second gripping element.

10. The apparatus as in claim 1, wherein the second gripping element is a belt having a tread on the surface opposed to the first gripping element.

11. The apparatus as in claim 1, wherein the first and second gripping elements are belts having a tread on the surfaces disposed substantially linearly in parallel with the axis of the hose.

12. The apparatus as in claim 1 further comprising an anchoring structure configured to prevent movement of the apparatus along the hose during use.

13. The apparatus as in claim 12 further comprising a support structure extending from the bottom frame and configured to engage an interior surface of an access hole.

14. The apparatus as in claim 1 wherein the access hole is a sewer manhole and the bottom frame is configured to extend over the manhole.

15. The apparatus as in claim 1, wherein the hinge defines a pivot point of the upper frame, and wherein the hinge is adjustable to move a location of the pivot point relative to the bottom frame.

16. The apparatus as in claim 1, wherein the latch is adjustable to adjust an opposed spacing between the upper and lower frames when latched in a closed position.

17. The apparatus as in claim 1, wherein the drive mechanism is a chain drive mechanism, a belt drive mechanism or a shaft drive mechanism.

18. The apparatus as in claim 1, wherein a handle is configured to receive a manhole lid for allowing said manhole lid to rest on said handle, the handle being mounted on a motor end of the apparatus to act as a counterweight during use.

* * * * *